Oct. 12, 1948.  S. B. HASELTINE  2,451,028
HAND BRAKE
Filed Oct. 22, 1945  2 Sheets-Sheet 1
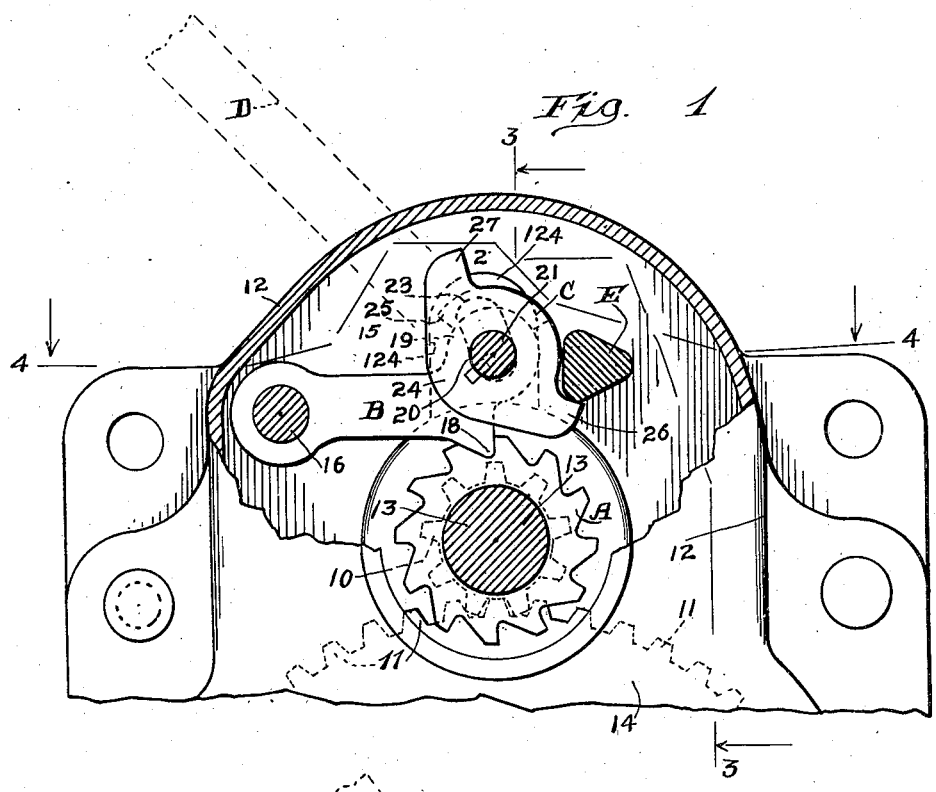
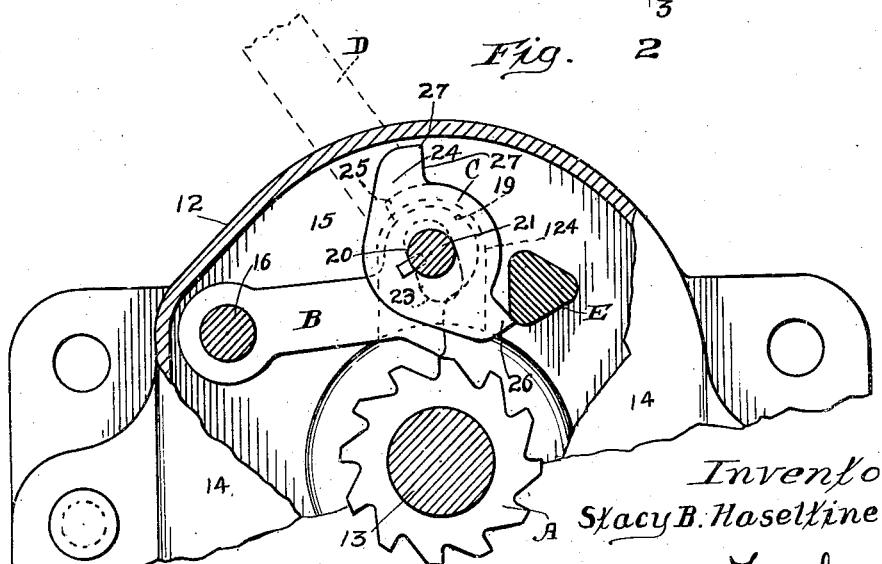
Inventor:
Stacy B. Haseltine.
By Henry Fuchs.
Atty.

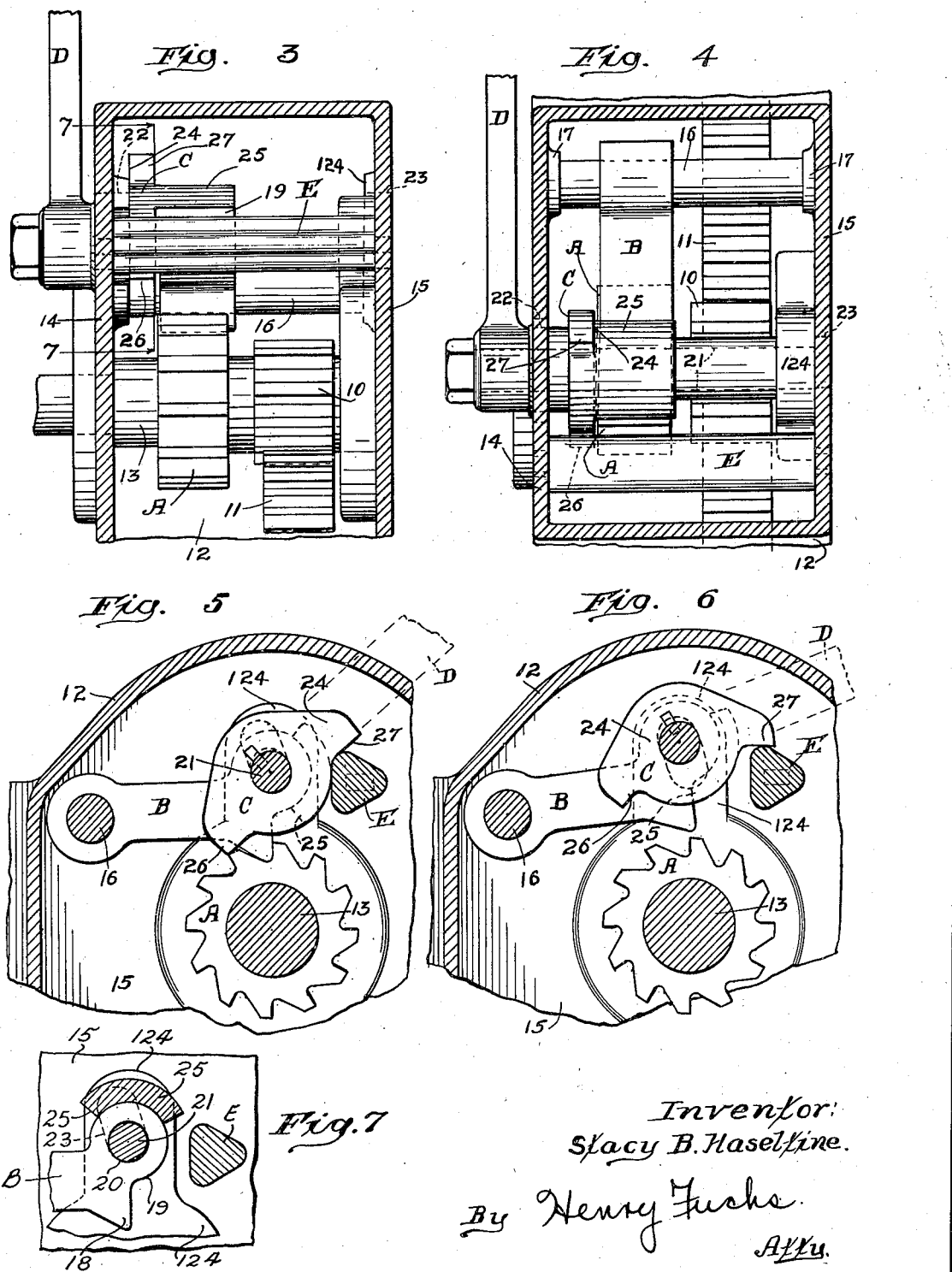

UNITED STATES PATENT OFFICE 2,451,028

HAND BRAKE

Stacy B. Haseltine, La Grange, Ill., assignor to W. H. Miner, Inc., Chicago, Ill., a corporation of Delaware Application October 22, 1945, Serial No. 623,726

6 Claims. (Cl. 188—81.1)

This invention relates to improvements in hand brakes for railway cars.

One object of the invention is to provide a hand brake mechanism of the power multiplying, gear operated type, especially adapted for railway cars, comprising a ratchet and cooperating locking dog for holding the mechanism against movement in brake releasing direction, wherein means is provided for forcibly disengaging the dog from the ratchet to assure release of the brakes.

A further object of the invention is to provide a mechanism of the character set forth in the preceding paragraph wherein the means for releasing the dog is in the form of a lever actuated trip member pivoted to the toothed end of the dog and having camming engagement with a fixed stop to forcibly disengage the dog from the ratchet member and overcome the forces tending to hold the dog locked to the ratchet member.

A still further object of the invention is to provide a hand brake mechanism as hereinbefore set forth wherein the weight of the lever for actuating the trip member in one position thereof yieldingly holds the dog engaged with the ratchet wheel and the weight thereof in another position effects automatic release of the dog upon slight tightening of the brake mechanism by means of the usual actuating hand wheel.

Other objects of the invention will more clearly appear from the description and claims hereinafter following.

In the drawings forming a part of this specification, Figure 1 is a front elevational view, partly in transverse vertical section, of the upper portion of a gear operated brake mechanism, illustrating my improvements in connection therewith. Figure 2 is a view similar to Figure 1, partly broken away, showing the parts of the brake mechanism in ratcheting action with the dog riding over the tooth of the ratchet member. Figure 3 is a vertical sectional view, corresponding substantially to the offset line 3—3 of Figure 1. Figure 4 is a horizontal sectional view, corresponding substantially to the line 4—4 of Figure 1. Figures 5 and 6 are views similar to Figure 1, broken partly away, showing the parts in somewhat different position, illustrating two different stages of the brake releasing operation. Figure 7 is a vertical sectional view corresponding substantially to the line 7—7 of Figure 3.

As illustrated in the drawing, my improvements are employed in connection with a well-known type of power multiplying gear brake, employing the usual brake drum on which the chain is wound, the drum being rotated by a driving pinion 10 actuated by the hand wheel of the brakes, not shown, and meshing with the gear wheel 11 which is rotatable with the winding drum. The parts of the brake mechanism are contained in the usual housing, which is indicated by 12.

My improved mechanism proper comprises broadly a ratchet wheel A rotatable with the driving pinion of the power multiplying gear brake; a pivoted locking dog B cooperating with the ratchet wheel; a trip element C pivoted to the locking dog; an operating or trip lever D for actuating the trip element; and a fixed stop E with which the trip element has camming engagement.

The ratchet wheel A is of the usual type, and is fixed to the shaft 13 which also has the pinion 10 fixed thereto and is actuated by the usual hand wheel, not shown, which is located on the shaft exteriorly to the housing. The shaft 13 has its opposite ends journaled in the usual manner in the front and rear walls 14 and 15 of the housing.

The locking dog B is swingingly supported above the ratchet wheel, being pivoted at its inner end on a pin 16 having its opposite ends fixed in inwardly projecting bosses 17—17 on the housing walls 14 and 15. At its outer end, the dog B is provided with a tooth 18 which engages the teeth of the ratchet wheel A. At the toothed end, the dog B has an upstanding rounded enlargement 19 presenting a substantially cylindrical, outer bearing surface. The enlargement 19 is offset to the right with respect to the tooth 18, as seen in Figures 1, 2, 5, 6 and 7. The enlargement 19 has a central, transverse bore 20 therethrough in which a short shaft 21 is journaled. The shaft 21 extends through a slot 22 in the front wall 14 of the housing and has the operating or trip lever D fixed to the outer end thereof. The opposite or inner end of the shaft 21 is slidingly guided in a slot 23 formed in an inwardly projecting boss 124 on the back wall 15 of the housing. The slot 23 is in alignment with the slot 22. As will be evident, the slots 22 and 23 permit the shaft 21 to swing up and down with the dog B as the latter is moved into and out of engagement with the ratchet wheel A. The shaft 21 also carries the trip element C which is in the form of a cam member. The element C is fixed to the shaft 21 for rotation in unison therewith and comprises a platelike body portion 24 located on said shaft between the front wall 14 of the housing and the dog B. The element C is preferably keyed to the shaft 21. On its inner side, the platelike portion 24 of the element C has a laterally extending, arcuate flange 25 which overhangs the enlargement 19 of the dog B and is in bearing engagement with the cylindrical surface thereof, as shown in Figures 3 and 7. This flange 25 acts as a limiting stop means for restricting the swinging movement of the trip element C, the lower end edge of said flange being engageable with the upper portion of the tooth 18 of the dog, as illustrated in Figure 6, to limit swinging movement of the element C and the trip lever D in right hand direction, as shown in dotted lines in said figure. The platelike portion 24 of the element C has a pair of oppositely extending, radial cam lugs 26 and 27, which cooperate with the stop E.

The stop E comprises a bar of substantially triangular, transverse cross section having its opposite ends rigidly fixed in the walls 14 and 15 of the housing 12. As shown in Figures 1, 2, 3, 5, and 6, the stop bar E is located above the ratchet wheel A to the right side thereof and is so placed that it is in the path of movement of the cam lugs 26 and 27 of the element C. As clearly shown in the drawings, the corners of the bar E are preferably rounded off so as to provide smooth camming action.

The operation of my improved ratchet hand brake mechanism is as follows: When the brakes have been applied, the locking dog B holds the same against release by engagement of the toothed end of the dog with the teeth of the ratchet wheel A, as shown in Figure 1. In this position of the parts, the cam lug 26 of the trip element C is engaged with the underneath side of the stop bar E and the gravity influenced lever action of the lever D tends to hold the dog thus engaged. To release the brakes, the trip lever D is swung to the right from the dotted line position shown in Figure 1. As the trip lever D is swung to the right, the cam lug 27 of the trip element C engages the stop E, as shown in Figure 5. In this position, the tooth of the dog B is still engaged with the ratchet wheel. The brakes are then tightened slightly by turning the drum in chain winding direction and thereby rotating the ratchet wheel in clockwise direction, as viewed in Figure 5, thus relieving the pressure on the tooth of the dog and permitting the trip lever D to drop to the dotted line position shown in Figure 6, thereby automatically throwing the dog out of engagement with the ratchet wheel by lifting the shaft 21 through camming action of the lug 27 with the stop bar E, the weight of the overbalanced trip lever being sufficient to produce this result through the action of gravity. The dog is also manually disengageable from the ratchet wheel by the attendant swinging the trip lever D from the dotted line position shown in Figure 1 through the position shown in Figure 5 to that shown in Figure 6, thereby forcibly camming the shaft 21 upwardly to lift the dog. As will be evident by this manual operation of the lever D, sufficient power is exerted to lift the dog to effect withdrawal of the same from engagement with the ratchet wheel without the slight tightening of the brakes which is necessary to loosen the dog in the automatic operation hereinbefore referred to. As will be evident, the weight of the lever D, when in the position shown in Figure 6, maintains the dog B in disengaged position and must be manually operated to effect reengagement of the dog with the ratchet wheel. To operatively engage the dog B with the ratchet wheel A, the trip lever D is swung to the left from the position shown in Figure 6 to that shown in Figure 1. This swinging movement of the lever effects engagement of the cam lug 26 of the trip element C with the stop bar E, thereby forcibly camming the toothed end of the dog into operative engagement with the teeth of the ratchet wheel. After the dog has thus been engaged, it is yieldingly maintained in operative engagement by the weight of the overbalanced lever D through camming engagement of the cam projection 26 of the element C with the underneath side of the stop bar E. In ratcheting action of the dog B during tightening of the brakes, the tooth of the dog rides over the teeth of the ratchet wheel, the dog swinging on its pivot and being yieldingly urged against the ratchet wheel by the weight of the lever D in conjunction with the camming action of the element C.

I claim:

1. In a hand brake, the combination with a member adapted to be rotated to effect tightening of the brake; of a ratchet wheel rotatable with said member; a locking dog above said wheel having ratcheting engagement with the latter, said dog being pivoted at one end and having a tooth at the other end engageable with said ratchet wheel; and means for engaging said dog with said ratchet wheel comprising a lever operated trip member rotatably connected to said dog at the toothed end thereof, a radially projecting cam lug on said trip member, and a fixed stop above said wheel and outwardly beyond the toothed end of the dog with the underneath side of which said cam lug is engageable.

2. In a hand brake, the combination with a member adapted to be rotated to effect tightening of the brake; of a ratchet wheel rotatable with said member; a locking dog having ratcheting engagement with said wheel, said dog being pivoted at one end and having a tooth at the other end engageable with said ratchet wheel; and means for engaging said dog with the ratchet wheel and disengaging the same therefrom, comprising a rotary trip element having a journaled connection with said dog at the toothed end thereof, and a stop member with which said trip element cooperates, said trip element having spaced cam lugs respectively engageable with said stop member to effect said engagement of the dog with the ratchet wheel and said disengagement of the same therefrom.

3. In a hand brake, the combination with a member adapted to be rotated to effect tightening of the brake; of a ratchet wheel rotatable with said member; a locking dog pivoted at one end and having a tooth at the other end engageable with said ratchet wheel; a fixed stop member; a trip element rotatably connected to said dog at the toothed end thereof; a lever fixed to said trip element for rotating the same; and a cam lug on said trip element engageable with said stop member for swinging the dog into engagement with the ratchet wheel.

4. In a hand brake, the combination with a member adapted to be rotated to effect tightening of the brake; of a ratchet wheel rotatable with said member; a locking dog pivoted at one end and having a tooth at the other end engageable with said ratchet wheel; a fixed stop member; a trip element rotatably connected to said dog at the toothed end thereof; a lever fixed to said trip element for rotating the same; and a pair of spaced cam lugs on said element, one of said lugs being engageable with said stop member to swing said dog into engagement with the ratchet wheel, and the other of said lugs being engageable with said stop member to swing said dog out of engagement with the ratchet wheel.

5. In a hand brake, the combination with a member adapted to be rotated to tighten the brakes; of a ratchet wheel rotatable with said member, said wheel being mounted for rotation about a horizontal axis; a locking dog having ratcheting engagement with said wheel, said dog being disposed above said ratchet wheel, pivoted at one end, and having a tooth at the other end engageable with said ratchet wheel; and means for disengaging said dog from the ratchet wheel comprising a lever pivotally connected to the toothed end of the dog and upstanding therefrom, a trip element swingable with said lever, and a stop with which said trip element is engageable to cam said dog out of engagement with the ratchet wheel, the weight of said lever when swung to one side of its vertical position tending to throw said dog out of engagement with the ratchet wheel through camming action between said trip element and fixed stop.

6. In a hand brake, the combination with a member adapted to be rotated to tighten the brakes; of a ratchet wheel rotatable with said member, said wheel being mounted for rotation about a horizontal axis; a locking dog having ratcheting engagement with said wheel, said dog being disposed above said ratchet wheel, pivoted at one end, and having a tooth at the other end engageable with said ratchet wheel; and means for engaging said dog with the ratchet wheel and yieldingly maintaining it engaged therewith, comprising a lever pivotally connected to the toothed end of the dog and upstanding therefrom, a trip element swingable with said lever, a fixed stop with which said element is engageable to cam the dog into engagement with the ratchet wheel, the weight of said lever when swung to one side of the vertical position yieldingly holding said dog engaged with the ratchet wheel through camming action between said element and fixed stop.

STACY B. HASELTINE.

REFERENCES CITED

The following references are of record in the file of this patent:

UNITED STATES PATENTS

| Number | Name | Date |
|---|---|---|
| 2,070,017 | Lounsbury | Feb. 9, 1937 |